United States Patent
Kikuchi et al.

(10) Patent No.: US 12,448,068 B2
(45) Date of Patent: Oct. 21, 2025

(54) MANUFACTURING METHOD FOR ROOF MODULE

(71) Applicant: YACHIYO INDUSTRY CO., LTD., Sayama (JP)

(72) Inventors: Moto Kikuchi, Tochigi (JP); Hirotaka Kamioka, Tochigi (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/860,436

(22) PCT Filed: Feb. 20, 2023

(86) PCT No.: PCT/JP2023/005992
§ 371 (c)(1),
(2) Date: Oct. 25, 2024

(87) PCT Pub. No.: WO2023/210127
PCT Pub. Date: Nov. 2, 2023

(65) Prior Publication Data
US 2025/0289524 A1 Sep. 18, 2025

(30) Foreign Application Priority Data
Apr. 28, 2022 (JP) ................. 2022-074706

(51) Int. Cl.
*B62D 65/02* (2006.01)
*B60J 1/20* (2006.01)
(52) U.S. Cl.
CPC ........... *B62D 65/026* (2013.01); *B60J 1/2063* (2013.01); *B60J 1/2066* (2013.01)

(58) Field of Classification Search
CPC ...... B62D 65/026; B60J 1/2063; B60J 1/2066
See application file for complete search history.

(56) References Cited

U.S. PATENT DOCUMENTS

| | | | |
|---|---|---|---|
| 8,777,303 B2 * | 7/2014 | Annawald | B60J 7/0015 296/215 |
| 8,833,843 B2 | 9/2014 | Wolfgang et al. | |

(Continued)

FOREIGN PATENT DOCUMENTS

| | | |
|---|---|---|
| CN | 103009971 A | 4/2013 |
| EP | 3168072 A1 | 5/2017 |
| JP | H 09226379 A | 9/1997 |

OTHER PUBLICATIONS

International Search Report (with English translation) received in corresponding Application No. PCT/JP2023/005992, dated Apr. 25, 2023, 4 pages.

(Continued)

*Primary Examiner* — Jason L Vaughan
*Assistant Examiner* — Amanda Kreiling
(74) *Attorney, Agent, or Firm* — Dority & Manning, P.A.

(57) ABSTRACT

A manufacturing method for a roof module includes: a step of fixing a mounting member to an inner surface of a roof panel; a step of assembling a shade unit provided with a pair of guide rails, a shade sheet, and a winding device; a step of attaching a jig for keeping the guide rails parallel to each other to the shade unit; a step of fixing the shade unit to which the jig is attached to the mounting member; and a step of detaching the jig from the shade unit mounted to the inner surface of the roof panel.

3 Claims, 11 Drawing Sheets

(56) References Cited

U.S. PATENT DOCUMENTS

2004/0075304 A1  4/2004  Jean-Guy
2012/0255690 A1  10/2012 Gwenole et al.

OTHER PUBLICATIONS

CN Office Action(with English translation) for Application No. 202380023730.0 dated Dec. 5, 2024.

* cited by examiner

MANUFACTURING METHOD FOR ROOF MODULE

CROSS-REFERENCE TO RELATED APPLICATIONS

This application is the U.S. National Stage entry of International Application No. PCT/JP2023/005992, filed on Feb. 20, 2023, which, in turn, claims priority to Japanese Patent Application No. 2022-074706, filed on Apr. 28, 2022, both of which are hereby incorporated herein by reference in their entireties for all purposes.

TECHNICAL FIELD

The present invention relates to a manufacturing method for a roof module of a vehicle.

BACKGROUND ART

Conventionally, as a sunroof unit (module) for a vehicle, there is known a sunroof unit including a roof window and a roller blind system (unit) arranged below the roof window and having two guide rails (see Patent Document 1). The guide rails are fastened to the window using fastening sections which are glued to the window from underneath the window. The guide rails are provided with slots extending in the vehicle width direction, and the fastening sections are formed fixing holes. The guide rails are bolted to the fastening sections with fastening bolts which are passed through the slots and fixed to the fixing holes. Since the slots are elongated in the vehicle width direction, the guide rails can be fixed to the roof in a variable position in the vehicle width direction.

PRIOR ART DOCUMENT(S)

Patent Document(s)

Patent Document 1: U.S. Pat. No. 8,833,843B2

SUMMARY OF THE INVENTION

Task to be Accomplished by the Invention

However, in the conventional sunroof module, when fixing the guide rails to the window, it is necessary to dispose the guide rails in parallel with each other and to fix the guide rails in this state with bolts. Therefore, the assembly of the sunroof module takes time.

In view of the foregoing background, an object of the present invention is to easily assemble the roof module.

Means to Accomplish the Task

To achieve the above object, one aspect of the present invention provides a manufacturing method for a roof module (1) comprising: a roof panel (2) to be disposed on a roof of a vehicle; a pair of guide rails (6) extending in a front-rear direction of the vehicle along an inner surface of the roof panel and mounted on the roof panel via a mounting member (23); a shade sheet (8) guided by the guide rails; and a winding device (9) supported by the guide rails and configured to wind up the shade sheet, the method comprising: a step of fixing the mounting member to the inner surface of the roof panel; a step of assembling a shade unit (3) provided with the guide rails, the shade sheet, and the winding device; a step of attaching a jig (30) for keeping the guide rails parallel to each other to the shade unit; a step of fixing the shade unit to which the jig is attached to the mounting member; and a step of detaching the jig from the shade unit mounted to the inner surface of the roof panel.

According to this aspect, the shade unit can be fixed to the mounting member with the pair of guide rails being kept parallel to each other by the jig, and thus, the assembly of the roof module is easy.

In the above aspect, preferably, the roof module further comprises a drive source (12) for driving the shade sheet in an opening and closing direction and a bracket (13) for supporting the drive source, in the step of assembling the shade unit, the winding device and the drive source are arranged in a concentrated manner on a rear end side of the guide rails, and the manufacturing method further comprises a step of fixing the bracket to the inner surface of the roof panel.

According to this aspect, since the winding device and the drive source are arranged in a concentrated manner on the rear end side of the guide rails, a space is created on the front end side of the guide rails. Therefore, functional components, such as interior lights, operation switches therefor, operation switches for the sunshade, etc., can be arranged in a free layout in this space.

In the above aspect, preferably, the jig includes a pair of parallel retention members (31) extending in parallel with each other in a width direction of the vehicle and holding the guide rails, and a spacing retention part (32) connecting the parallel retention members to keep a spacing between the parallel retention members constant.

According to this aspect, a jig can be embodied with a simple structure including a pair of parallel retention members and a spacing retention part.

In the above aspect, preferably, the shade unit further comprises a rear cross member (7) connecting rear portions of the guide rails to each other.

According to this aspect, when assembling the shade unit, the pair of guide rails can be treated as a rail assembly in which the guide rails are connected by the rear cross member, and thus, the assembly of the shade unit is easy.

Effect of the Invention

According to the above aspect, the roof module can be assembled easily.

MODE(S) FOR CARRYING OUT THE INVENTION

In the following, an embodiment of the present invention will be described in detail with reference to the drawings.

Figure 1:
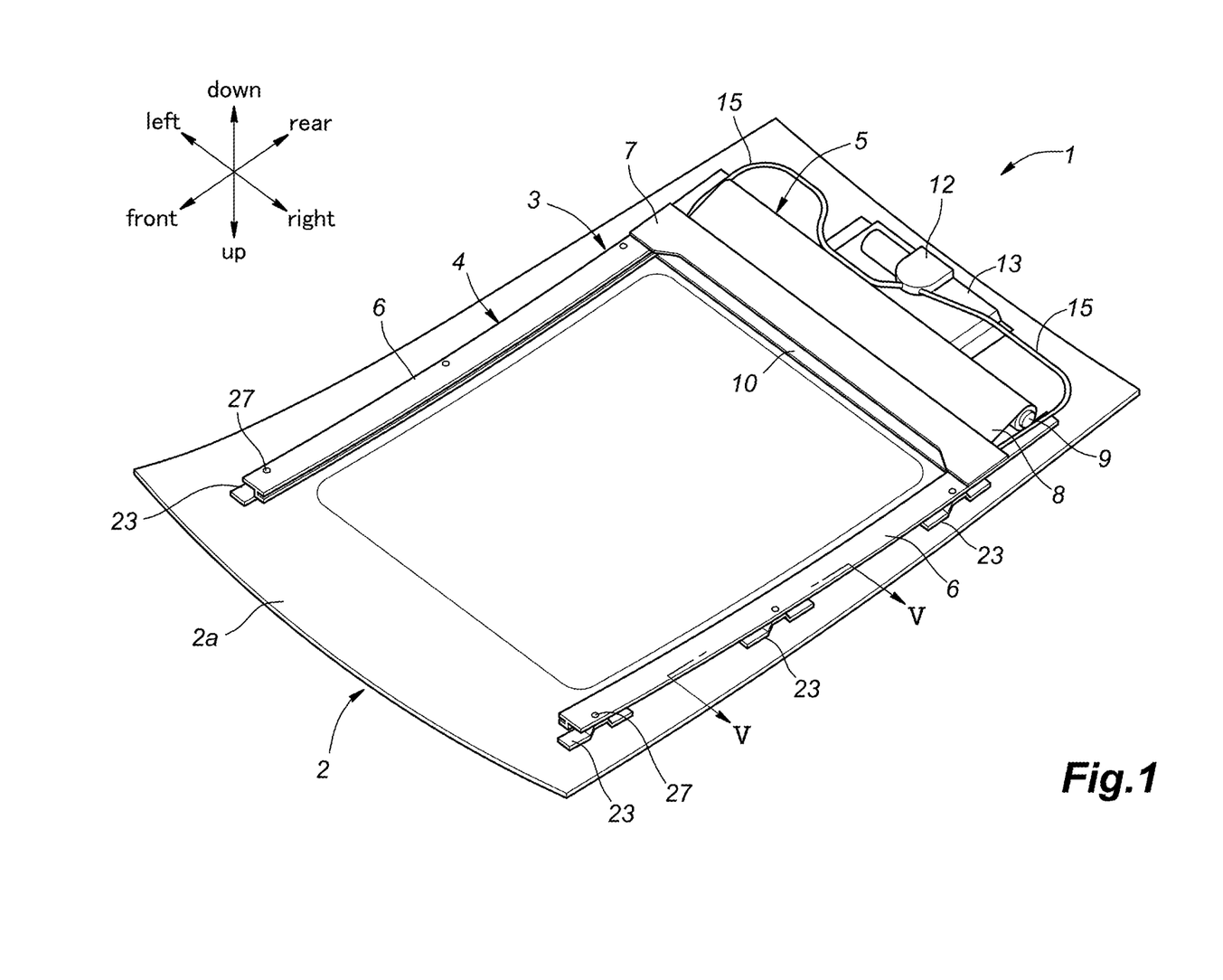
FIG. 1 is a perspective view showing a roof module according to an embodiment as seen from the interior side.

FIG. 1 is a perspective view showing a roof module 1 according to the embodiment as seen from the interior side. As shown in FIG. 1, the roof module 1 is configured to be disposed on an inner panel or side rails of a roof of a vehicle having an opening and supported by the inner panel or the side rails so that the roof module 1 functions as an outer panel forming an outer surface of the roof. The roof module 1 is provided with a roof panel 2 and a shade unit 3 mounted on an inner surface (lower surface) of the roof panel 2.

The roof panel 2 is an outer panel forming the outer surface of the roof and is made of transparent or translucent glass or resin. The roof panel 2 has a shape curved in the left-right direction and the front-rear direction so as to be convex upward and is provided in a front portion of the roof. Accordingly, the front edge of the roof panel 2 is connected to the rear edge of the windshield via a seal member. From a rear part of the roof panel 2, an outer panel made of metal may continue or a rear window may continue.

The shade unit 3 is a device for selectively blocking light passing the roof panel 2 into the vehicle cabin, and is disposed between the roof panel 2 and the inner panel or the side rails. Preferably, the inner surface of an outer peripheral portion of the roof panel 2 is coated with black ceramic 2a so that only the central part of the roof panel 2 is transparent or translucent.

The shade unit 3 includes a rail assembly 4 mounted on the inner surface of the roof panel 2 and a roll shade 5 supported by the rail assembly 4. The rail assembly 4 is provided with a pair of guide rails 6 mounted on the inner surface of the roof panel 2 and extending in the front-rear direction of the vehicle and a rear cross member 7 connecting rear portions of the two guide rails 6 to each other near the rear ends. Each guide rail 6 is an extrusion molded product made of aluminum alloy and is curved in the longitudinal direction so as to be convex upward in conformity with the shape of the roof panel 2. The guide rails 6 have bilaterally symmetrical shapes and are disposed on side portions of the roof panel 2 to be parallel to each other, with a predetermined spacing therebetween in the vehicle width direction. The rear cross member 7 is a press molded product made of a steel plate and is rigidly joined to rear portions of the two guide rails 6. Thereby, the rail assembly 4 has a U-shape (a channel shape or a rectangle with an open front side) in plan view.

Figure 2:
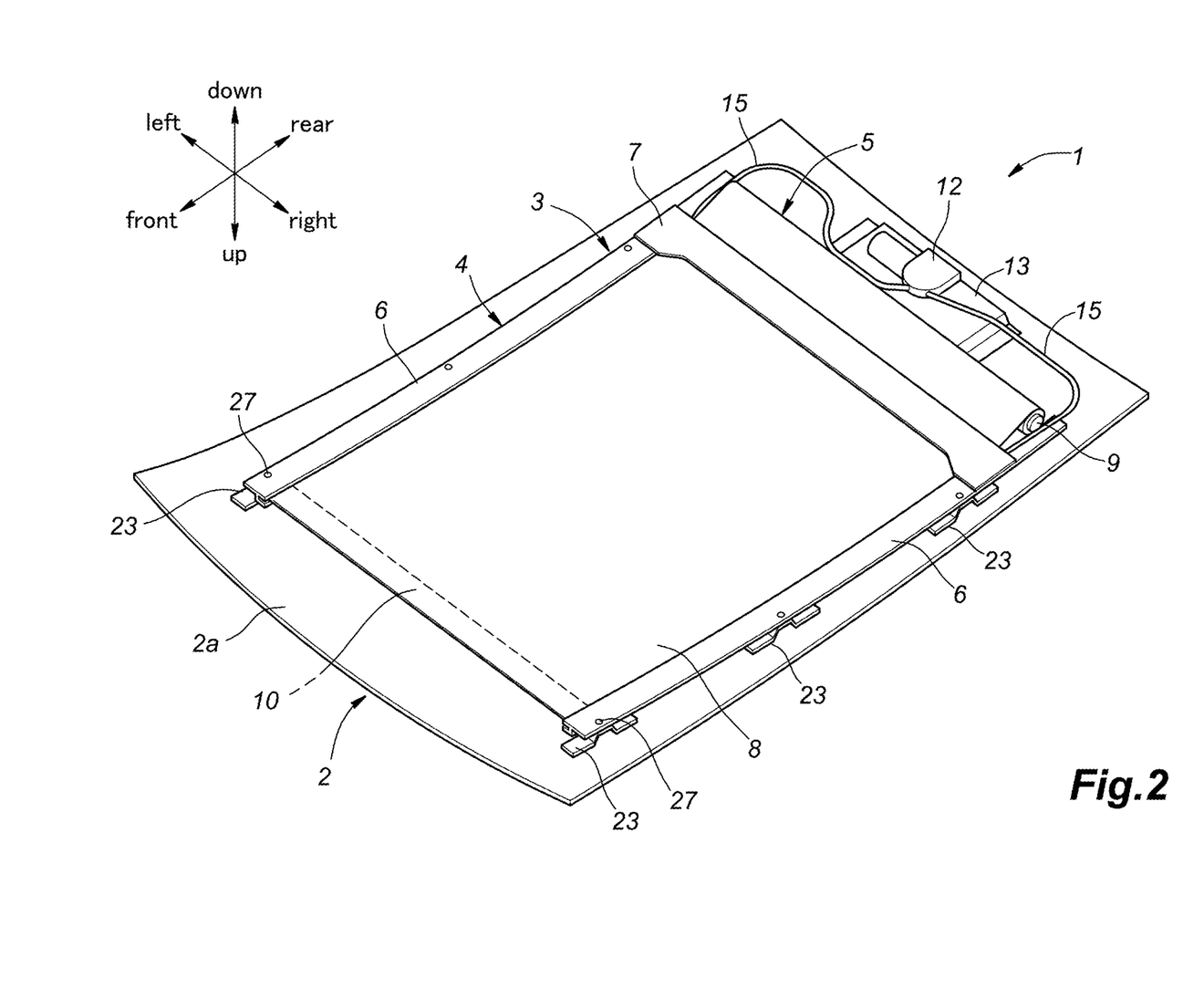
FIG. 2 is a perspective view of the roof module with a shade unit in a closed state.

FIG. 1 is a perspective view showing the roof module 1 in an open state in which the roof panel 2 is not covered by the roll shade 5. On the other hand, FIG. 2 is a perspective view of the roof module 1 in a closed state in which the roof panel 2 is covered by the roll shade 5. As also shown in FIG. 2, the roll shade 5 is provided with a shade sheet 8 for blocking light passing through the roof panel 2 and a winding device 9 for winding up the shade sheet 8. The shade sheet 8 is guided by the guide rails 6 to be movable between a deployed position shown in FIG. 2 in which the shade sheet 8 is deployed inside the roof panel 2 and a stowed position shown in FIG. 1 in which the shade sheet 8 does not cover but opens the roof panel 2. The shade sheet 8 does not necessarily have to block light completely but may be configured to block at least part of light.

When in the stowed position, the shade sheet 8 is wound up by the winding device 9. The winding device 9 is disposed behind the rear cross member 7 and is supported at the rear ends of the guide rails 6. The winding device 9 is provided with a retraction spring (retractor spring) and always urges the shade sheet 8 in the winding direction toward the stowed position. Thereby, the shade sheet 8 is maintained taut in the front-rear direction. A cross bar 10 extending in the vehicle width direction is mounted at the front end of the shade sheet 8. Sliders 11 (see FIG. 3) supported by the respective guide rails 6 are integrally provided on both ends of the cross bar 10.

The rear cross member 7 is disposed in front of the winding device 9, and the cross bar 10 is disposed in front of the rear cross member 7. The shade sheet 8 extends from the winding device 9 to the cross bar 10 by passing above the rear cross member 7, and is always in contact with the upper surface of the rear cross member 7. Namely, the shade sheet 8 is guided by the rear cross member 7 and is held at the height of the upper surface of the rear cross member 7 at any pull-out position.

Behind the winding device 9, a drive source 12 for driving the shade sheet 8 in the unwinding direction and the winding direction is disposed. The drive source 12 is detachably mounted to a bracket 13 attached to the inner surface of the rear end portion of the roof panel 2 with bolts. The drive source 12 includes a motor and a speed reduction mechanism, and drives left and right power transmission members 14 (see FIG. 4), each consisting of a push-pull cable, by pushing and pulling them in a synchronized manner. The power transmission members 14 are connected to the sliders 11 at the front ends thereof, and convert the driving force into a force in the front-rear direction to transmit the force to the sliders 11. When the drive source 12 moves the cross bar 10 forward or rearward via the pair of power transmission members 14 and the pair of sliders 11, the shade sheet 8 is selectively driven in the unwinding direction or the winding direction.

The drive source 12 is disposed in a middle part of the roof panel 2 in the width direction. The power transmission members 14 are guided by a pair of guide pipes 15 between the drive source 12 and the respective guide rails 6. Namely, the drive source 12 is connected to the pair of guide rails 6 via the pair of guide pipes 15. Each power transmission member 14 is inserted into the guide rail 6 from the rear end of the guide rail 6 and extends forward to the slider 11 to which the front end thereof is connected.

Figure 3:
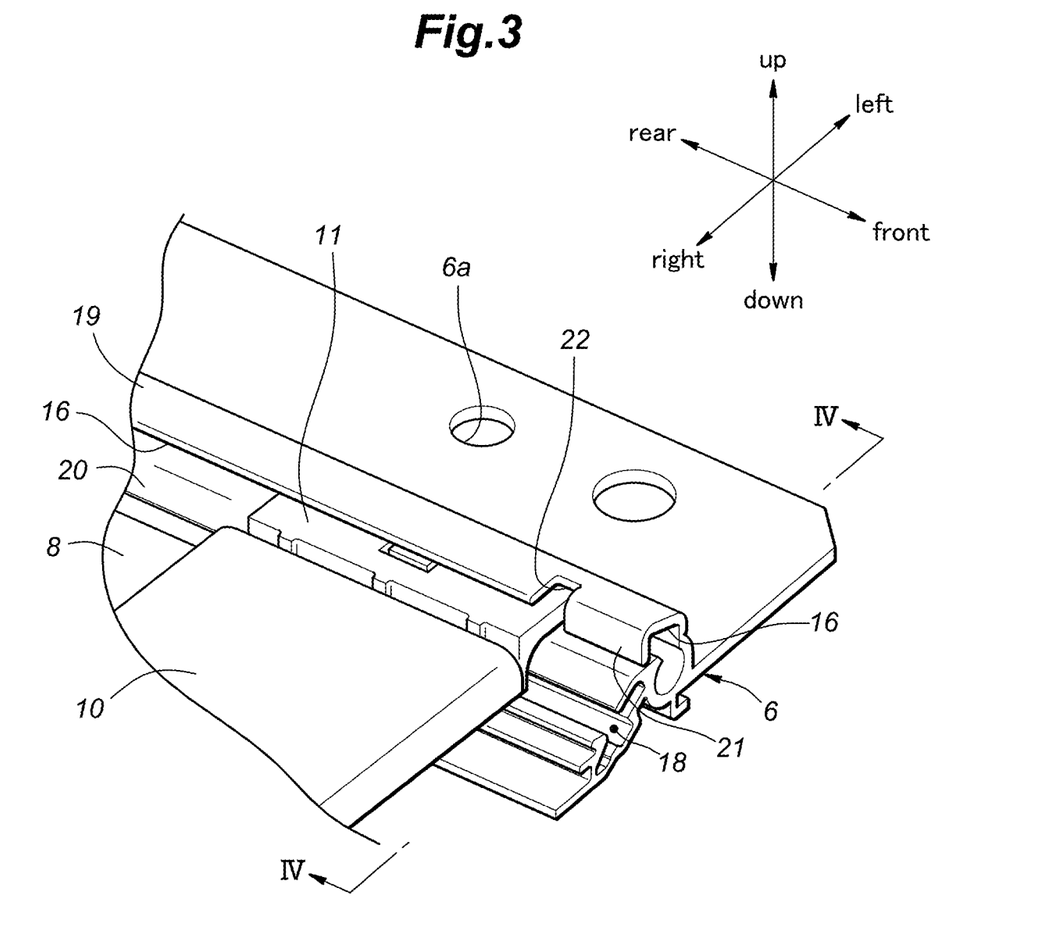
FIG. 3 is an enlarged perspective view of a front end portion of a guide rail as seen from the interior side.
Figure 4:
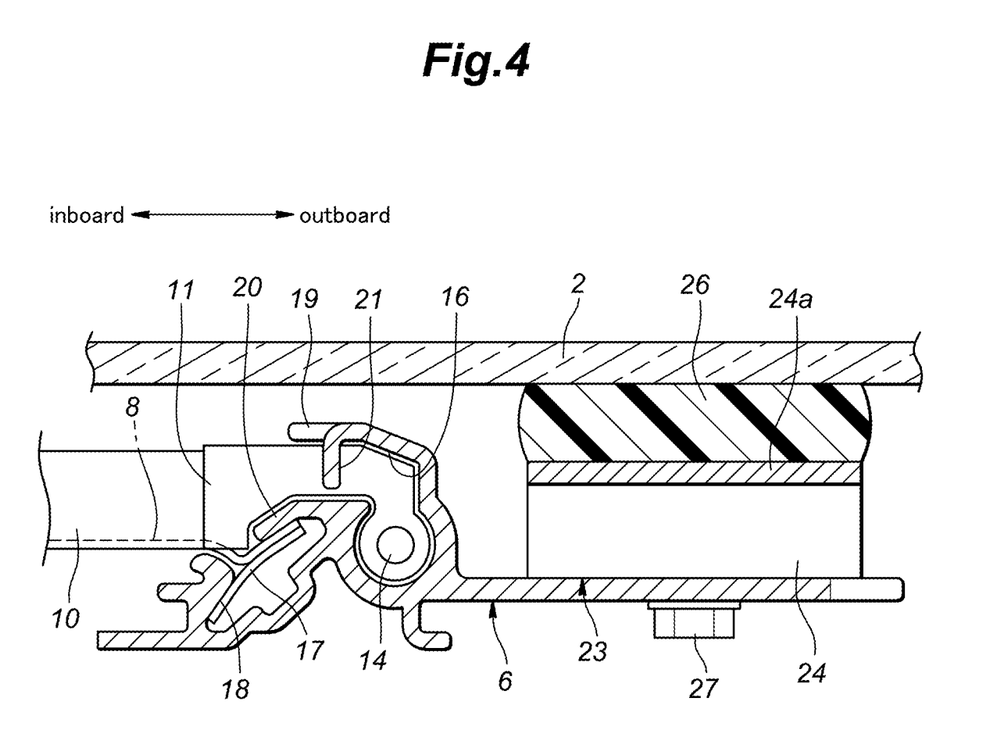
FIG. 4 is a sectional view taken along line IV-IV in FIG. 3.

FIG. 3 is an enlarged perspective view of a front end portion of the guide rail 6 as seen from the interior side, and FIG. 4 is a sectional view taken along line IV-IV in FIG. 3. As shown in FIGS. 3 and 4, the guide rail 6 is provided with a slider guide groove 16 for guiding the slider 11 and a belt guide groove 18 for guiding a guide belt 17 attached to a side edge of the shade sheet 8. The slider guide groove 16 is defined by an upper guide wall 19 and a lower guide wall 20 and is open toward the inside with respect to the vehicle width direction. The belt guide groove 18 is positioned below the slider guide groove 16, and the lower guide wall 20 also defines an upper part of the belt guide groove 18. The left and right guide belts 17 of the shade sheet 8 are supported by the left and right belt guide grooves 18 to be slidable in the front-rear direction. Thereby, the shade sheet 8 is guided by the guide rails 6 and is maintained taut in the vehicle width direction by a predetermined tensile force.

As shown in FIG. 3, the front end of the guide rail 6 is integrally formed with a stopper 21 for restricting the forward movement of the slider 11. The stopper 21 is formed of a front end part of the upper guide wall 19 that is separated from the rear portion by a notch 22 formed in an inner edge of the upper guide wall 19 with respect to the vehicle width direction and is bent downward so as to protrude into the slider guide groove 16.

As described above, since the stopper 21 for restricting the movement of the shade sheet 8 in the unwinding direction is integrally formed on the guide rail 6, there is no need to attach the stopper member to the guide rail 6 as a separate member, and the number of components can be reduced. Also, the stopper 21 can be easily formed of a part of the upper guide wall 19 separated by the notch 22 formed in the upper guide wall 19 and is bent toward the slider guide groove 16.

Figure 5:
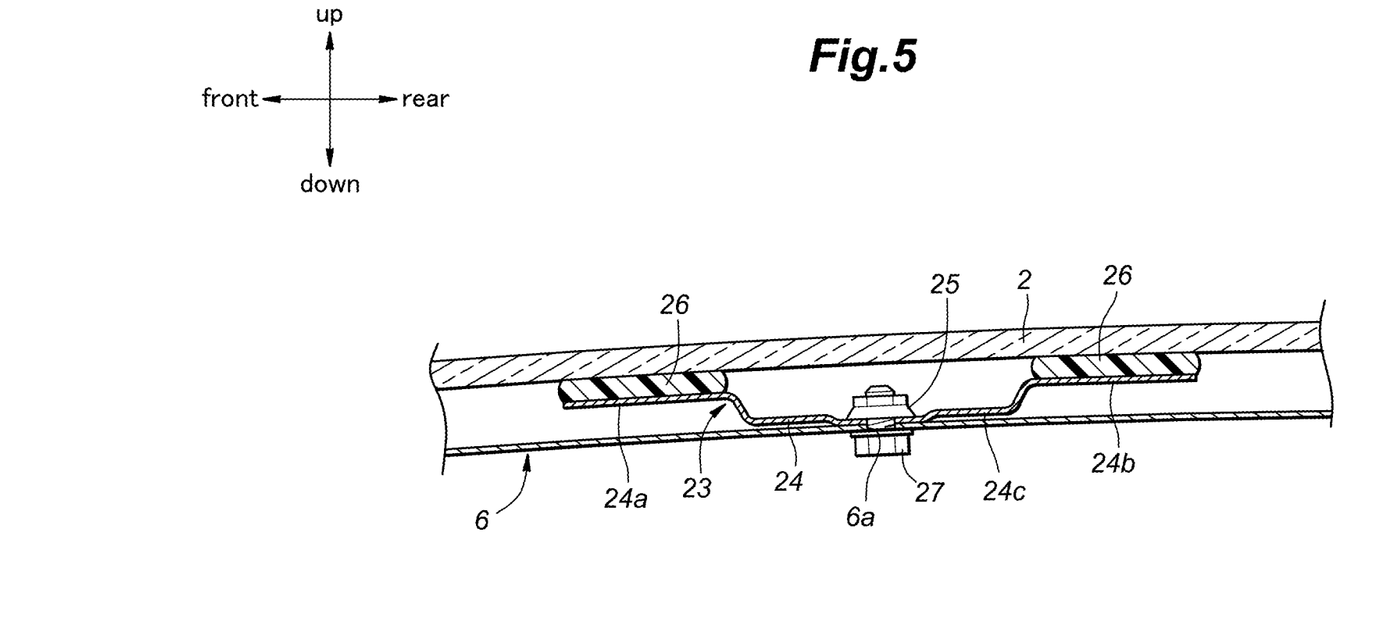
FIG. 5 is a sectional view taken along line V-V in FIG. 1.

FIG. 5 is a sectional view taken along line V-V in FIG. 1. As shown in FIGS. 1 and 5, the guide rail 6 is detachably mounted to multiple rail brackets 23 attached to the inner surface of a side portion of the roof panel 2. In the present embodiment, each rail bracket 23 includes a bracket main body 24 that is a press molded product elongated in the front-rear direction and a weld nut 25 welded to the upper surface of the bracket main body 24. The bracket main body 24 includes a front portion 24a and a rear portion 24b that are joined to the roof panel 2 by an adhesive agent 26 and an intermediate portion 24c disposed below the roof panel 2 via a gap. The weld nut 25 is welded to the upper surface of the intermediate portion 24c.

The guide rail 6 is fastened to each rail bracket 23 with a bolt 27 inserted in a bolt hole 6a formed in the guide rail 6 and threadably engaged with the weld nut 25. The bolt hole 6a is formed to be larger than the shaft portion of the bolt 27. The pair of guide rails 6 is fixed by the bolts 27 in a state in which the guide rails 6 are disposed in predetermined positions to be parallel to each other. Thereby, the shade sheet 8 is maintained taut in the left-right direction.

The roof module 1 is configured as described above. Next, the effects of the roof module 1 will be described.

As described above, the roof module 1 shown in FIGS. 1 and 2 is provided in the front portion of the roof of the vehicle. The front portion of the roof of the vehicle is generally positioned above the driver's seat. Therefore, below the front end portion of the roof module 1, many functional components, such as interior lights, operation switches therefor, operation switches for the shade unit 3, etc., are disposed. In the present embodiment, the winding device 9 and the drive source 12 are arranged in a concentrated manner on the rear end side of the guide rails 6, and no cross member connecting the guide rails 6 is provided on the front end side of the guide rails 6. Therefore, the degree of freedom of layout in the front portion of the roof is improved.

As described above, the roof module 1 is provided with the rear cross member 7 connecting the rear portions of the guide rails 6 to each other. Therefore, before being mounted to the roof panel 2, the pair of guide rails 6 can be treated as the rail assembly 4 in which the guide rails 6 are connected by the rear cross member 7, and thus, the manufacture of the roof module 1 is easy.

As described above, the rear cross member 7 is disposed in front of the winding device 9, and the shade sheet 8 is guided by the rear cross member 7. In other words, the rear cross member 7 functions as a guide member for the shade sheet 8. Therefore, there is no need to provide an additional member to guide the shade sheet 8, and the number of components of the roof module 1 is reduced.

The roof module 1 is provided with the pair of guide pipes 15 for guiding the power transmission members 14. The drive source 12 is disposed behind the winding device 9, and the drive source 12 is connected to the guide rails 6 via the guide pipes 15. Therefore, before being mounted to the roof panel 2, the drive source 12 and the rail assembly 4 can be treated as a shade assembly in which the drive source 12 is connected to the rail assembly 4 via the guide pipes 15, and thus, the manufacture of the roof module 1 is easy.

Next, an assembly procedure of the roof module 1 will be described with reference to FIGS. 6 to 10. The roof module 1 is assembled according to the following procedure to make a product to be assembled to the roof of a vehicle. The assembly work may be performed by a worker or may be performed by a robot or a machine.

Figure 6:
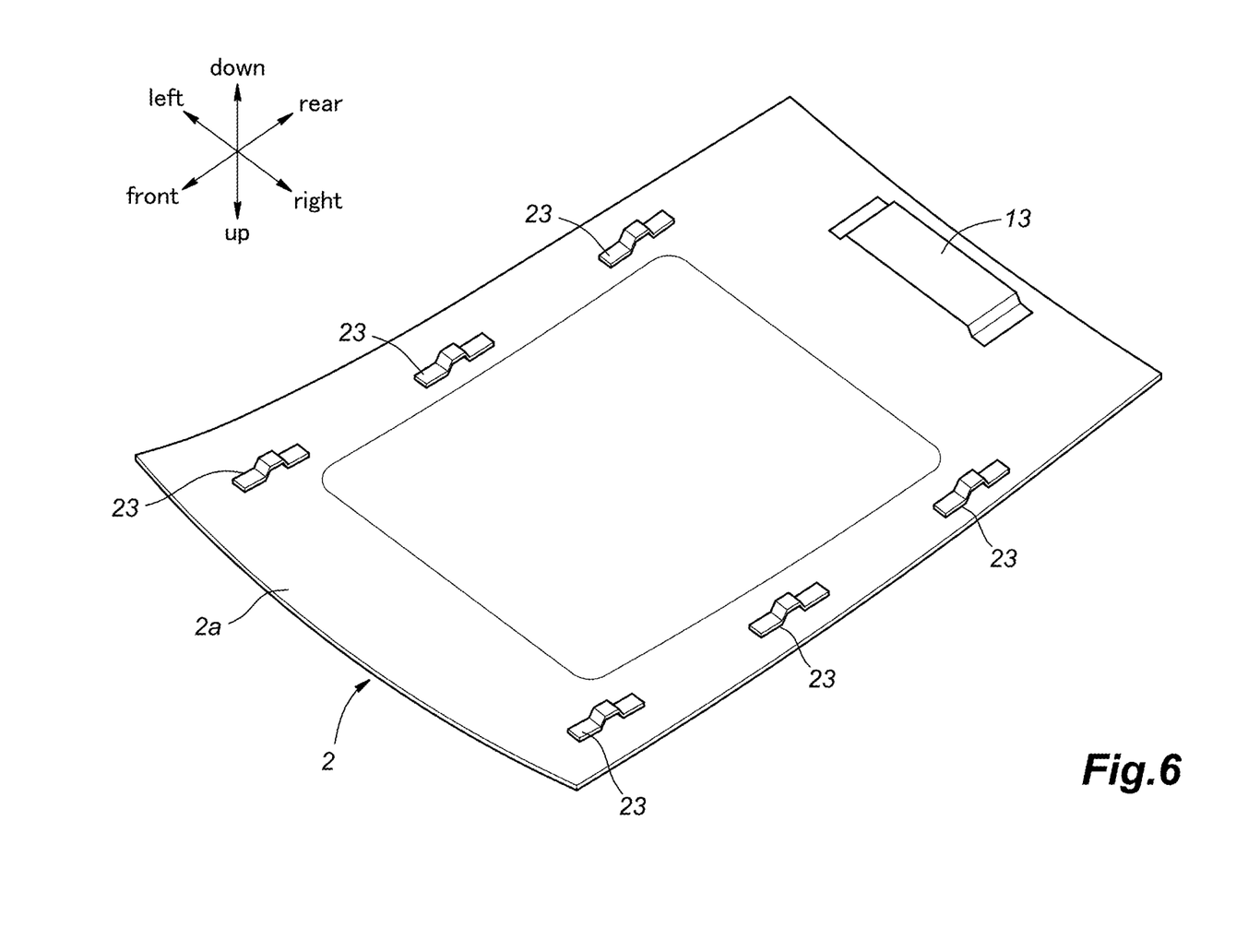
FIG. 6 is an explanatory diagram of an assembly procedure of the roof module according to the embodiment.

As shown in FIG. 6, the multiple rail brackets 23 are fixed to the inner surface of the roof panel 2. Specifically, an adhesive agent 26 (see FIG. 5) is applied to predetermined regions on the inner surface of the roof panel 2, and the rail brackets 23 are mounted on the adhesive agent 26. In the illustrated example, three rail brackets 23 for each of the left and right side portions of the roof panel 2, namely, six rail brackets 23 in total are mounted. By these rail brackets 23, a mounting member for mounting the pair of guide rails 6 to the roof panel 2 is configured. The mounting member is not limited to this embodiment, and may be composed of left and right rail-shaped brackets elongated in the front-rear direction or a rectangular frame-shaped bracket, for example.

Further, the bracket 13 for mounting the drive source 12 for driving the shade sheet 8 in the opening and closing direction is fixed to the inner surface of the roof panel 2. Specifically, an adhesive agent 26 (not shown in the drawings) is applied to predetermined regions on the inner surface of the roof panel 2, and the bracket 13 is mounted on the adhesive agent 26.

Preferably, the rail brackets 23 and the bracket 13 are mounted to the roof panel 2 by using a positioning jig not shown in the drawings. For example, the positioning jig includes a bracket-supporting jig configured to hold the rail brackets 23 and the bracket 13 in predetermined positions and in predetermined postures and a panel-supporting jig configured to hold the roof panel 2 in a predetermined position and in a predetermined posture. The bracket-supporting jig and the panel support the jig are disposed in predetermined positions relative to each other by being guided by reference pins. Thereby, the rail brackets 23 and the bracket 13 are mounted in predetermined positions on the inner surface of the roof panel 2.

Figure 7:
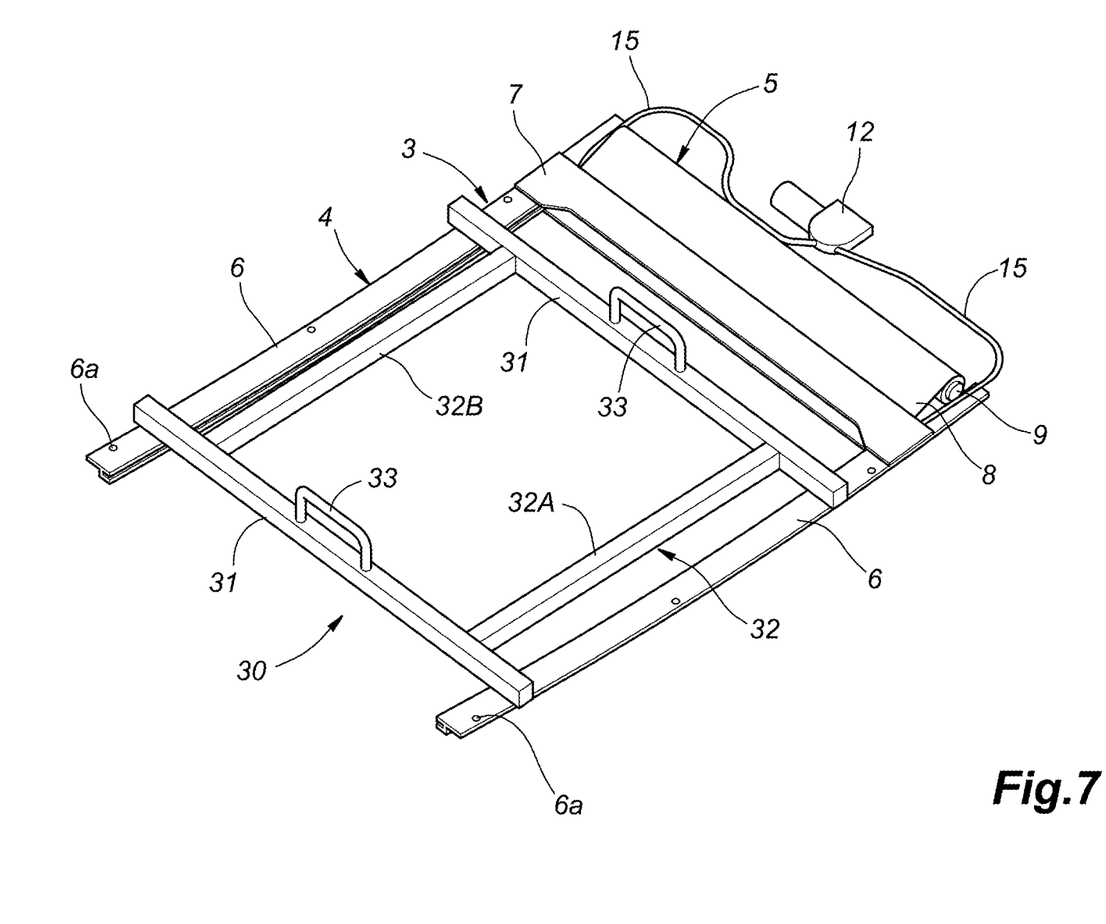
FIG. 7 is an explanatory diagram of the assembly procedure of the roof module according to the embodiment.

Separately from these works, as shown in FIG. 7, the shade unit 3 including the pair of guide rails 6, the rear cross member 7, the shade sheet 8, the winding device 9, and the drive source 12 is assembled. Since the shade unit 3 is provided with the rear cross member 7 connecting the rear portions of the guide rails 6 to each other, the pair of guide rails 6 can be treated as the rail assembly 4 in which the guide rails 6 are connected by the rear cross member 7. Therefore, the assembly of the shade unit 3 is easy.

After the assembly of the shade unit 3, a jig 30 for keeping the guide rails 6 parallel to each other is attached to the shade unit 3. The jig 30 includes a pair of parallel retention members 31 extending in parallel with each other in the vehicle width direction and holding the left and right guide rails 6, a spacing retention part 32 (32A, 32B) connecting the parallel retention members 31 to keep the spacing between the parallel retention members 31 constant, and a pair of handles 33 provided on the parallel retention members 31. On each of the end portions of each parallel retention member 31 in the vehicle width direction, an attachment member 34 (see FIG. 9) configured to be detachably attached to the associated guide rail 6 is mounted. The attachment member 34 will be described later.

In the present embodiment, the spacing retention part 32 is composed of a pair of spacing retention members 32A, 32B extending in the front-rear direction, and the spacing retention members 32A, 32B connect the front portions of the parallel retention members 31 to each other and the rear portions of the same to each other. The parallel retention members 31 and the spacing retention member 32A, 32B are each formed of a metal rectangular pipe. The handles 33 are each formed of a bent metal bar and are provided on the respective spacing retention members 32A, 32B. The spacing retention part 32 and the handles 33 are rigidly joined to the parallel retention members 31 by welding. When the jig 30 is attached to the shade unit 3, the guide rails 6 are kept parallel to each other by the jig 30.

Figure 8:
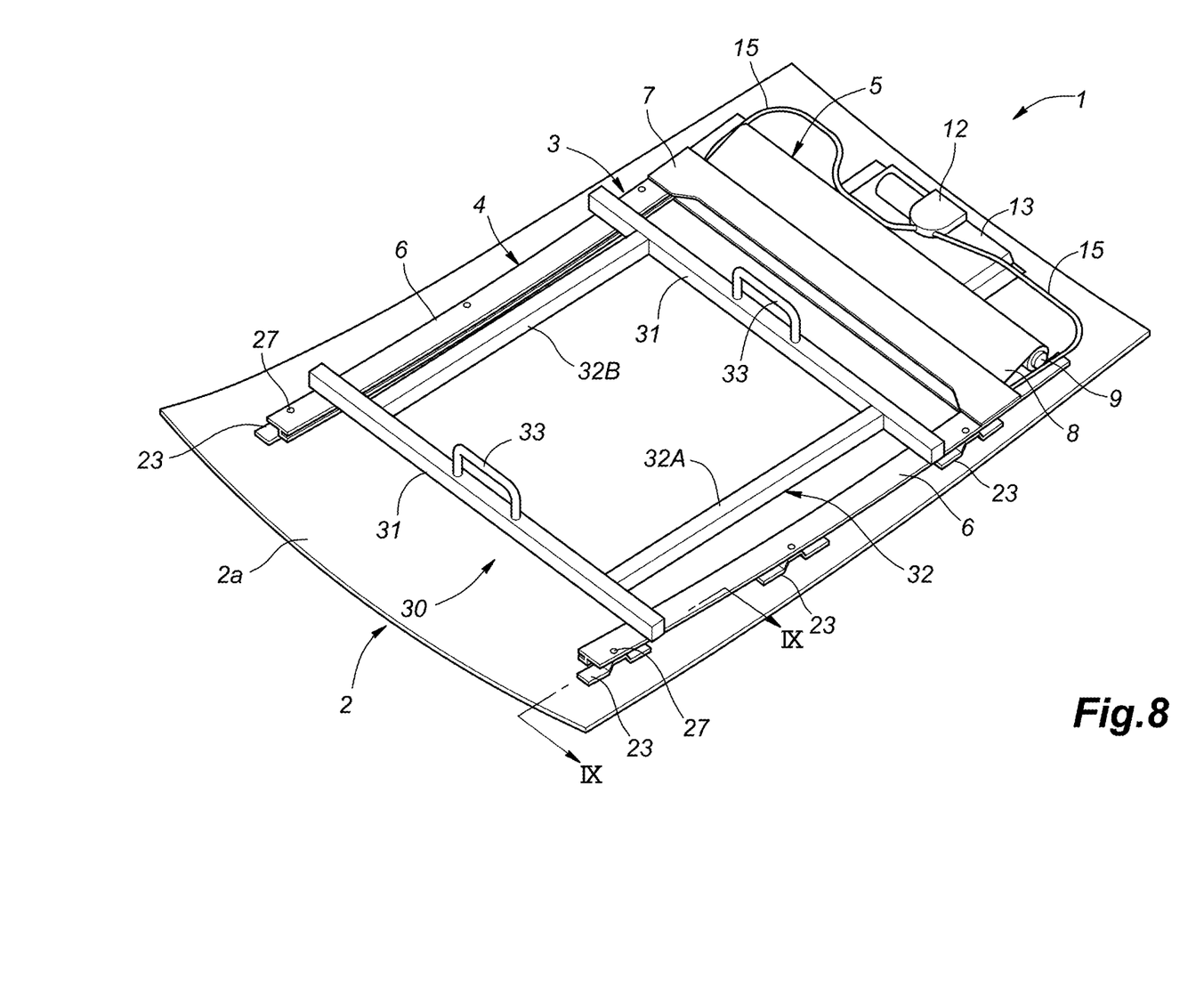
FIG. 8 is an explanatory diagram of the assembly procedure of the roof module according to the embodiment.

Next, as shown in FIG. 8, the handles 33 of the jig 30 are grasped, and then, the shade unit 3 to which the jig 30 is attached is fixed to the mounting member (namely, the multiple rail brackets 23) that is fixed to the roof panel 2 beforehand. Specifically, as shown in FIG. 5, by threadably engaging the bolt 27 with the weld nut 25 of each rail bracket 23, the guide rails 6 are fastened to the rail brackets 23. As described above, since each bolt hole 6a of the guide rail 6 is formed to be larger than the shaft portion of each bolt 27, an error in the mounting position of each rail bracket 23 is absorbed, and the guide rails 6 can be fixed to the roof panel 2 to be parallel to each other.

Further, the drive source 12 is fixed to the bracket 13. The drive source 12 is connected to the pair of guide rails 6 by the pair of guide pipes 15, and the position thereof can be easily adjusted by bending the guide pipes 15.

Figure 9:
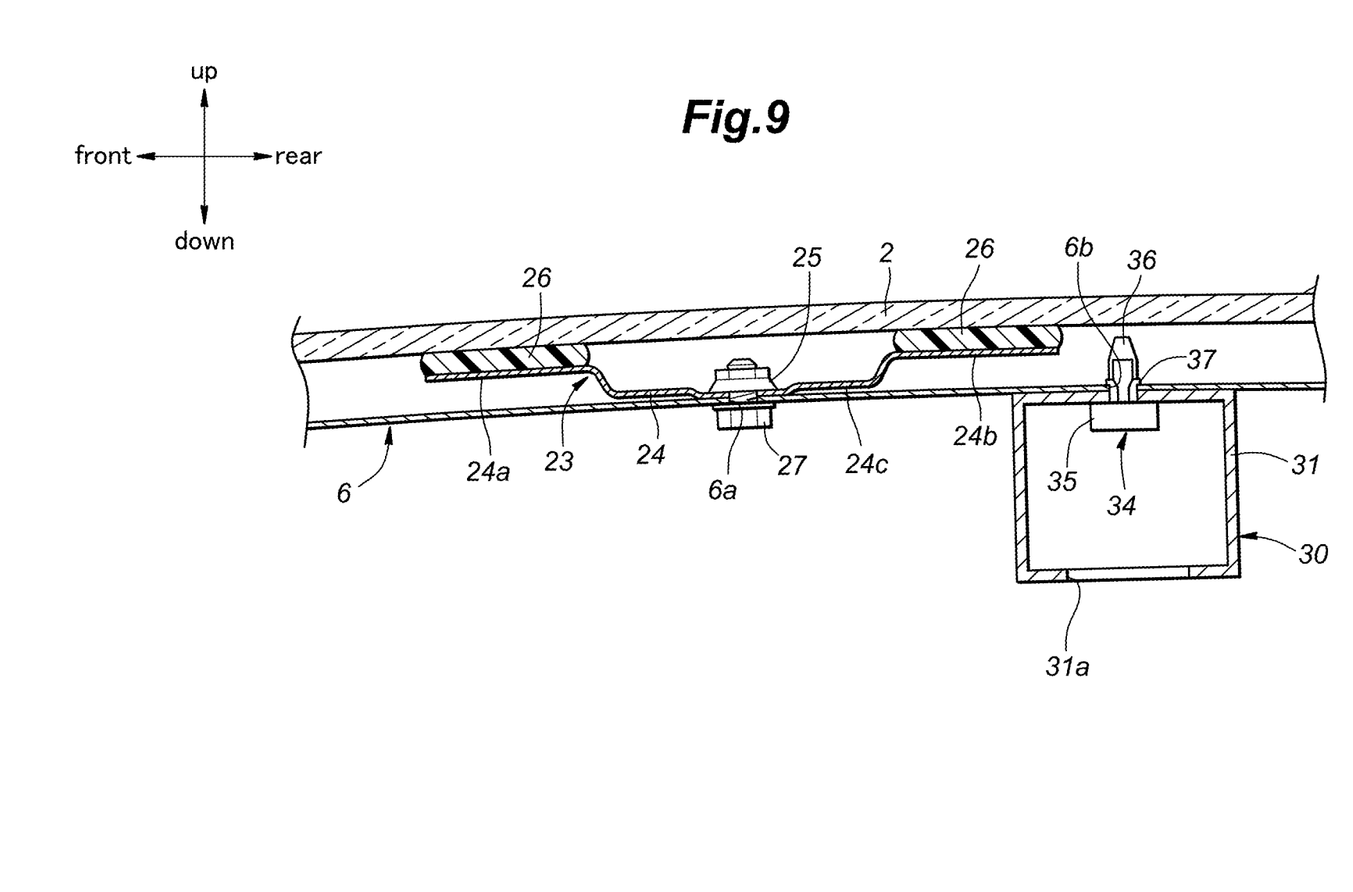
FIG. 9 is a sectional view taken along line IX-IX in FIG. 8.

FIG. 9 is a sectional view taken along line IX-IX in FIG. 8. As shown in FIG. 9, each attachment member 34 is a clip mounted to the parallel retention member 31. Each attachment member 34 includes a head 35 configured to engage with the parallel retention member 31, a shaft portion 36 configured to be inserted in an attachment hole 6b formed in the guide rail 6, and multiple engagement claws 37 configured to protrude from the shaft portion 36 in the radial direction to engage with the guide rail 6. The head 35 of the attachment member 34 is disposed in a hollow part of the parallel retention member 31, and a part of the lower wall of the parallel retention member 31 positioned on the extension line of the shaft portion 36 is formed with an access hole 31a. The attachment member 34 is configured to cause the engagement claws 37 to protrude and recede when operated through the access hole 31a, and thereby is detachably attached to the guide rail 6.

Figure 10:
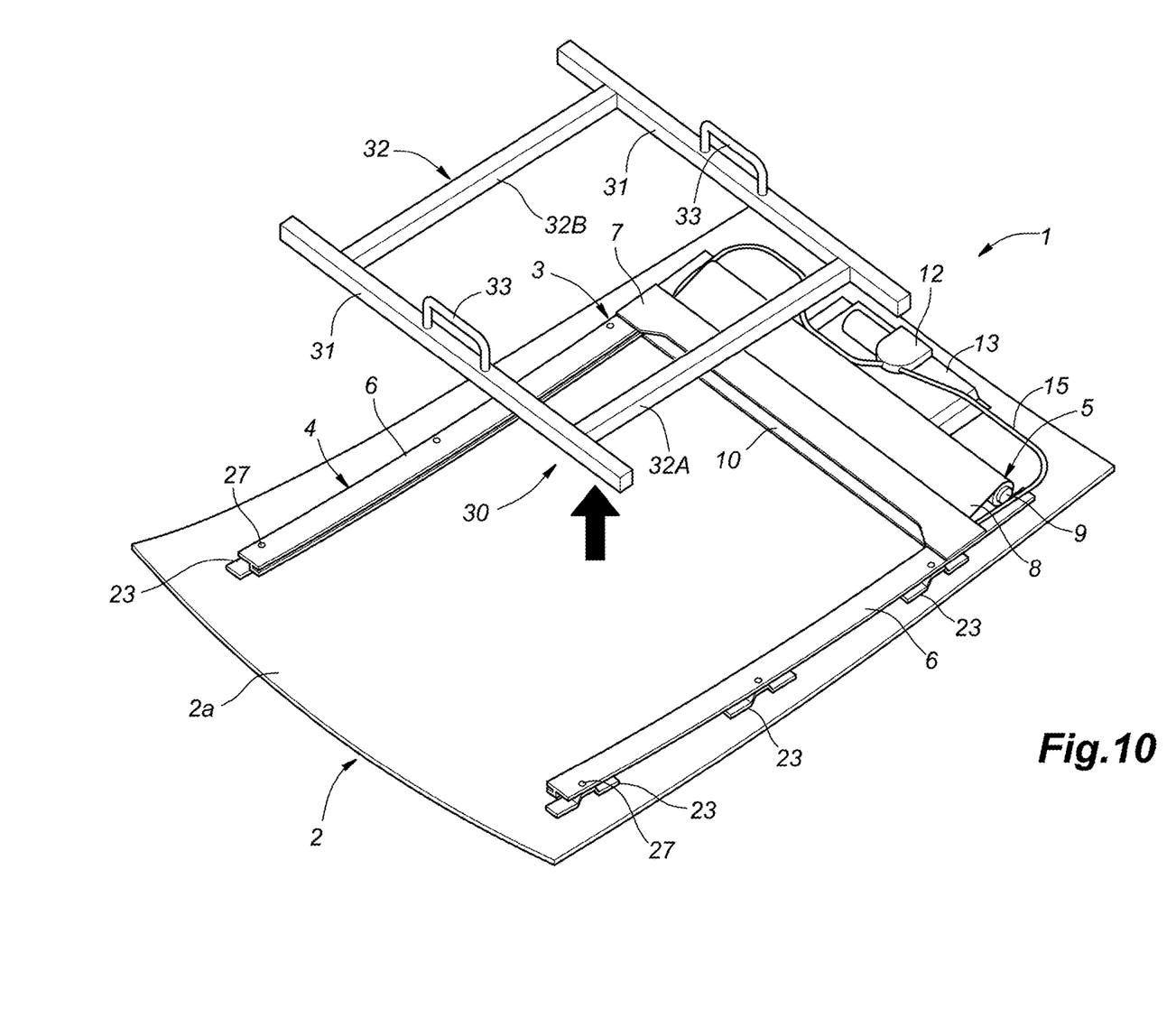
FIG. 10 is an explanatory diagram of the assembly procedure of the roof module according to the embodiment.

After the shade unit 3 is fixed to the roof panel 2 via the rail brackets 23, the engagement of the attachment members 34 with the guide rails 6 is released, and the jig 30 is detached from the shade unit 3, as shown in FIG. 10. Thereby, the assembly of the roof module 1 shown in FIG. 1 is completed. The manufacturing method for the roof module 1 includes the foregoing steps.

As described above, the manufacturing method for the roof module 1 includes the step of fixing the rail brackets 23 to the inner surface of the roof panel 2 shown in FIG. 6, the step of assembling the shade unit 3 as shown in FIG. 7, the step of attaching the jig 30 to the shade unit 3 shown in FIG. 7, the step of fixing the shade unit 3 to the rail brackets 23 shown in FIG. 8, and the step of detaching the jig 30 from the shade unit 3 shown in FIG. 10. Thus, since the shade unit 3 can be fixed to the rail brackets 23 in a state in which the guide rails 6 are kept parallel to each other by the jig 30, the assembly of the roof module 1 is easy.

In the step of assembling the shade unit 3 shown in FIG. 7, the winding device 9 and the drive source 12 are arranged in a concentrated manner on the rear end side of the guide rails 6. Therefore, as shown in FIG. 1, a space is created on the front end side of the guide rails 6, and functional components, such as interior lights, operation switches therefor, operation switches for the sunshade, etc., can be arranged in a free layout in this the space.

The jig 30 of the present embodiment shown in FIG. 7 is embodied with a simple structure including the pair of parallel retention members 31 and the spacing retention part 32 connecting the parallel retention members 31 to keep the spacing between the parallel retention members 31 constant.

Concrete embodiments have been described in the foregoing, but the present invention can be modified in various ways without being limited to the above embodiments. For example, since the jig 30 is configured such that each parallel retention member 31 can be grasped, the jig 30 does not have to be provided with the handles 33. Also, each attachment member 34 may be disposed outside (front or rear) the rectangular pipe constituting each parallel retention member 31. The spacing retention part 32 does not need to be composed of the pair of spacing retention members 32A, 32B and may be composed of three or more pipes or bars or may be composed of a single plate-shaped member.

Figure 11:
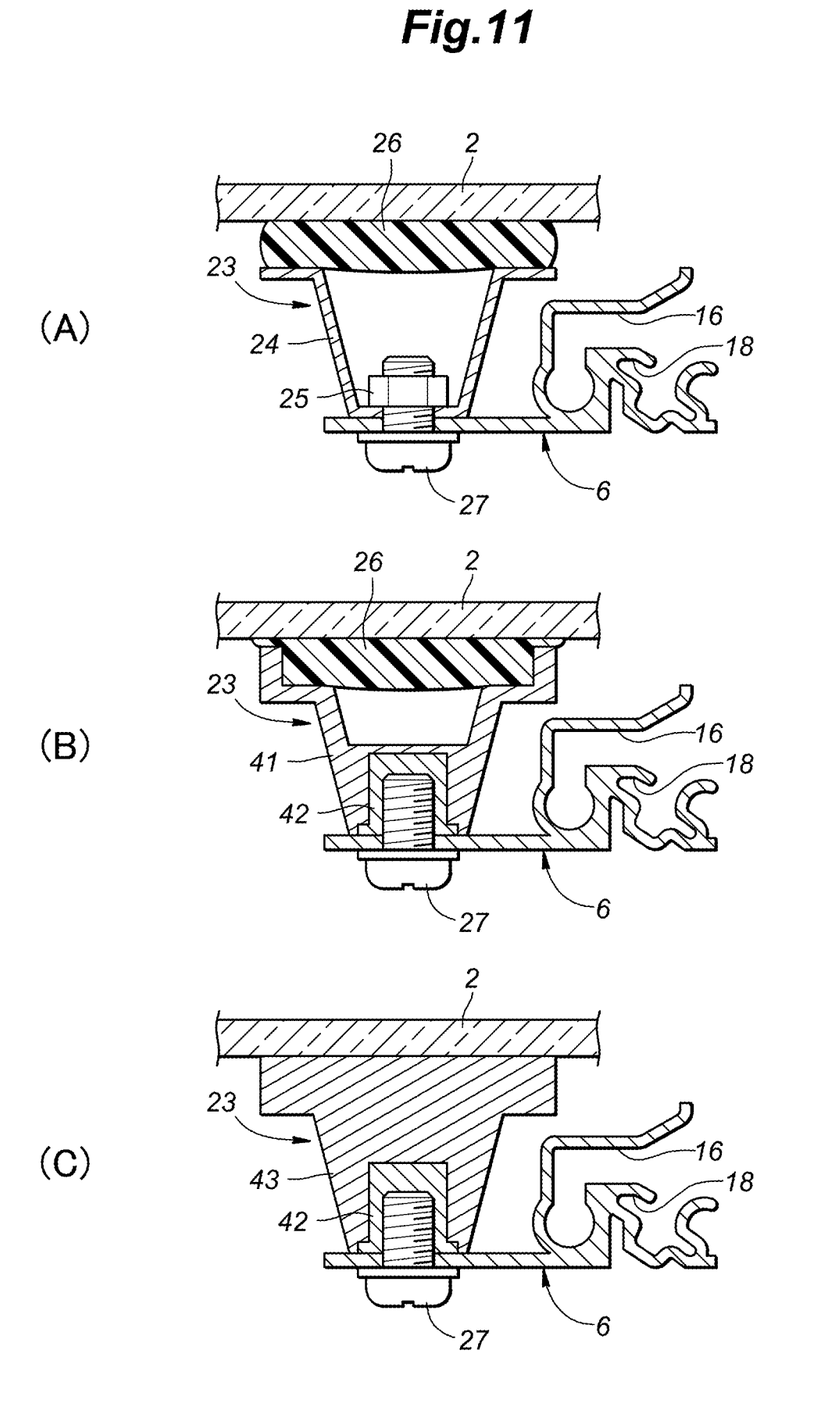
FIG. 11 is a sectional view showing modifications of a rail bracket.

Also, the rail bracket 23 is not limited to the configuration described above. FIG. 11 is a sectional view showing modifications of the rail bracket 23. FIG. 11(A) shows a form similar to the above embodiment. As shown in FIG. 11(A), in this modification, the bracket main body 24 is composed of a press molded product having an uneven shape in the vehicle width direction. In the example of FIG. 11(B), the rail bracket 23 includes a bracket main body 41 that is an injection molded product of resin and an insert nut 42 integrally provided in the bracket main body 41 so as to be exposed on the lower surface of the bracket main body 41. Similarly to the above embodiment, the bracket main body 41 is joined to the inner surface of the roof panel 2 by the adhesive agent 26. In the example of FIG. 11(C), the rail bracket 23 includes a bracket main body 43 that is a reaction injection molding (RIM) product of polyurethane (PUR) which is a thermosetting resin and an insert nut 42 integrally provided in the bracket main body 43 so as to be exposed on the lower surface of the bracket main body 43. Unlike the above embodiment, the bracket main body 43 is directly joined to the inner surface of the roof panel 2 without using the adhesive agent 26.

In the above embodiment, the power transmission members 14 are composed of push-pull cables. In another embodiment, each power transmission member 14 may be composed of a wire stretched in a loop. Besides, the concrete structure, arrangement, number, material or the like of each member or part may be appropriately changed without departing from the spirit of the present invention. Also, not all of the components shown in the foregoing embodiments are necessarily indispensable and they may be selectively adopted as appropriate.

LIST OF REFERENCE NUMERALS

1: roof module
2: roof panel

3: shade unit
6: guide rail
7: rear cross member
8: shade sheet
9: winding device
12: drive source
13: bracket
23: rail bracket (mounting member)
30: jig
31: parallel retention member
32: spacing retention part
32A, 32B: spacing retention member

The invention claimed is:

1. A manufacturing method for a roof module comprising: a roof panel to be disposed on a roof of a vehicle; a pair of guide rails extending in a front-rear direction of the vehicle along an inner surface of the roof panel and mounted on the roof panel via a mounting member; a shade sheet guided by the guide rails; and a winding device supported by the guide rails and configured to wind up the shade sheet, the method comprising:
a step of fixing the mounting member to the inner surface of the roof panel;
a step of assembling a shade unit provided with the guide rails, the shade sheet, and the winding device;
a step of attaching a jig for keeping the guide rails parallel to each other to the shade unit;
a step of fixing the shade unit to which the jig is attached to the mounting member; and
a step of detaching the jig from the shade unit mounted to the inner surface of the roof panel,
wherein the jig comprises a pair of parallel retention members extending in a width direction of the vehicle to be parallel to each other and retaining the guide rails, and a spacing retention part that connects the parallel retention members to each other and keeps the spacing between the parallel retention members constant.

2. The manufacturing method for a roof module according to claim 1, wherein the roof module further comprises a drive source for driving the shade sheet in an opening and closing direction and a bracket for supporting the drive source,
in the step of assembling the shade unit, the winding device and the drive source are arranged in a concentrated manner on a rear end side of the guide rails, and
the manufacturing method further comprises a step of fixing the bracket to the inner surface of the roof panel.

3. The manufacturing method for a roof module according to claim 1, wherein the shade unit further comprises a rear cross member that connects rear portions of the guide rails to each other.

* * * * *